United States Patent
Chen et al.

(10) Patent No.: US 10,989,649 B2
(45) Date of Patent: Apr. 27, 2021

(54) METHODS OF MEASURING FRICTION BETWEEN A SLIDER AND RAMP, AND RELATED SYSTEMS

(71) Applicant: Seagate Technology LLC, Cupertino, CA (US)

(72) Inventors: Jian Chen, Redhill (SG); Xiong Liu, Upper Bukit Timah (SG); Wei Sung Lee, Choa Chu Kang (SG); Erwin Mochtar Wijaya, Clementi (SG)

(73) Assignee: Seagate Technology LLC, Fremont, CA (US)

( * ) Notice: Subject to any disclaimer, the term of this patent is extended or adjusted under 35 U.S.C. 154(b) by 375 days.

(21) Appl. No.: 15/840,763

(22) Filed: Dec. 13, 2017

(65) Prior Publication Data

US 2019/0178785 A1    Jun. 13, 2019

(51) Int. Cl.
  *G01N 19/02* (2006.01)
  *G11B 5/54* (2006.01)
  *G11B 21/12* (2006.01)

(52) U.S. Cl.
  CPC .............. *G01N 19/02* (2013.01); *G11B 5/54* (2013.01); *G11B 21/12* (2013.01)

(58) Field of Classification Search
  CPC ....... Y10S 388/934; G01N 19/02; G11B 5/54; G11B 21/12; G11B 21/22; G11B 19/20; G11B 19/04; G11B 2005/001; G11B 21/083; G11B 21/21; G11B 2220/20; G11B 25/043; G11B 27/36; G11B 33/144; G11B 5/455; G11B 5/6005
  See application file for complete search history.

(56) References Cited

U.S. PATENT DOCUMENTS

| | | | |
|---|---|---|---|
| 5,341,260 A | 8/1994 | Jabbari | |
| 6,025,968 A | 2/2000 | Albrecht | |
| 6,054,833 A | 4/2000 | Takeuchi | |
| 6,154,340 A | 11/2000 | Cameron | |
| 6,275,356 B1 | 8/2001 | Boutaghou et al. | |
| 6,278,584 B1 | 8/2001 | Zhang et al. | |
| 6,288,876 B1 | 9/2001 | Albrecht et al. | |
| 6,519,115 B1* | 2/2003 | Yaeger | G11B 5/54 360/255.7 |
| 6,693,762 B2* | 2/2004 | Liu | G11B 5/455 360/73.03 |
| 6,735,540 B2 | 5/2004 | Pedrazzini et al. | |
| 7,005,820 B2 | 2/2006 | Tanner | |
| 7,196,863 B2* | 3/2007 | Sakamoto | G11B 5/54 360/75 |
| 7,864,480 B2 | 1/2011 | Ito | |

(Continued)

*Primary Examiner* — Nimeshkumar D Patel
*Assistant Examiner* — Gedeon M Kidanu
(74) *Attorney, Agent, or Firm* — Kagan Binder, PLLC

(57) ABSTRACT

Measuring ramp friction in a disk drive including receiving a lift tab ramp load time profile for a voice coil motor and determining a load torque profile for a lift tab on the ramp based at least on the received ramp load time profile. The measuring also includes receiving a lift tab ramp unload time profile for the voice coil motor and determining an unload torque profile for the lift tab on the ramp based at least on the received ramp unload time profile. The measuring also includes calculating a ramp friction torque component based on the determined load torque profile and unload torque profile.

24 Claims, 6 Drawing Sheets

(56) References Cited

U.S. PATENT DOCUMENTS

| | | | |
|---|---|---|---|
| 8,035,913 B2 * | 10/2011 | Kim | G11B 21/22 360/75 |
| 8,315,005 B1 | 11/2012 | Zou et al. | |
| 9,171,581 B2 * | 10/2015 | Lou | G11B 5/607 |

* cited by examiner

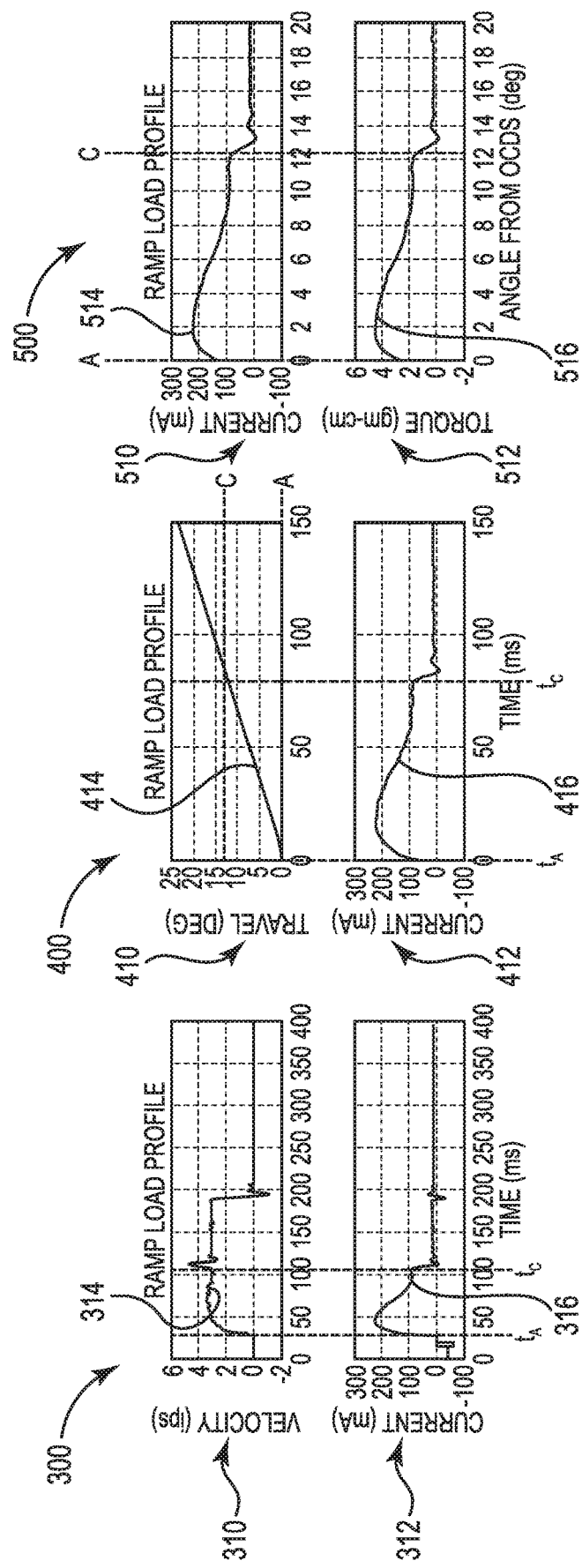

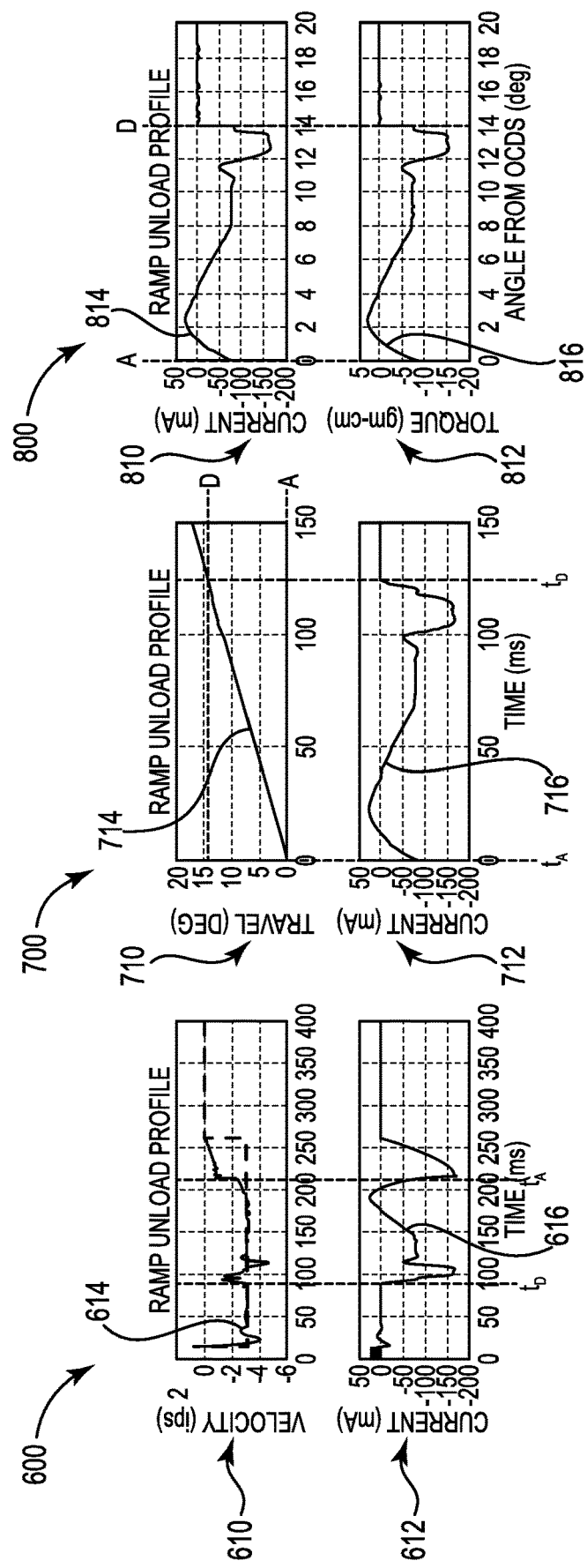

METHODS OF MEASURING FRICTION BETWEEN A SLIDER AND RAMP, AND RELATED SYSTEMS

BACKGROUND

Aspects of the present disclosure relate to hard-disk drives, and more particular aspects relate to slider load/unload technology for use in hard-disk drives.

Slider load/unload technology for use in hard-disk drives was devised in the 1990s as an improvement over the existing contact start-stop (CSS) systems. In the CSS systems, sliders carrying read/write heads would land on disk media at power down and remain stationary on the disk until a drive was powered back up. Load/unload technology, can employ a lift tab on a slider and a corresponding ramp to the side of the disk media for storage of the slider during non-use or in cases of detected imminent impact. Slider load/unload technology can improve durability, efficiency, and shock resistance of hard-disk drives.

Challenges related to slider load/unload technology remain, however. With regard to the ramp for use in load/unload technology in particular, ramp friction has become important to load and unload operations. In particular, if ramp friction is too high, an unload operation can be unsuccessful, leading to a head-on media (HOM) crash. On the other hand, if ramp friction is too low, an unlatching of the lift tab on the ramp may occur, leading to a drop of the slider and a HOM crash.

Existing methods and systems of ramp friction measurement include using a mechanical torque tester, which can be destructive of a ramp being tested. In addition, present mechanical torque tester methods and systems can be time consuming, arduous, and low resolution. Therefore, there is a need for improvements to ramp friction measurement.

SUMMARY

In a first aspect of the present disclosure, a method of measuring ramp friction in a disk drive in disclosed. The method includes receiving a lift tab ramp load time profile for a voice coil motor. The method also includes determining a load torque profile for a lift tab on the ramp based at least on the received ramp load time profile. The method also includes receiving a lift tab ramp unload time profile for the voice coil motor. The method also includes determining an unload torque profile for the lift tab on the ramp based at least on the received ramp unload time profile. The method also includes calculating a ramp friction torque component based on the determined load torque profile and unload torque profile.

In a second aspect of the present disclosure, a disk drive system is disclosed. The system includes a read/write head for reading and writing data on a rotatable magnetic recording medium. The system also includes an actuator assembly configured to mount and controllably position the read/write head on a desired portion of the magnetic recording medium, where the actuator arm assembly includes: an actuator arm, a voice coil motor, an angular movement detection device, and a current measurement device configured to measure current used or received at the voice coil motor while in use. The system also includes a lift tab operatively coupled to the actuator arm. The system also includes a ramp for selectively positioning the lift tab when not in use. The system also includes a controller configured to determine ramp friction. According to the system, the controller is configured to receive a lift tab ramp load time profile for a voice coil motor. According to the system, the controller is also configured to determine a load torque profile for a lift tab on the ramp based at least on the received ramp load time profile. According to the system, the controller is also configured to receive a lift tab ramp unload time profile for the voice coil motor. According to the system, the controller is also configured to determine an unload torque profile for the lift tab on the ramp based at least on the received ramp unload time profile. According to the system, the controller is also configured to calculate a ramp friction torque component based on the determined load torque profile and unload torque profile.

In a third aspect of the present disclosure, a computer program product for measuring ramp friction in a disk drive system is disclosed. The computer program product includes a computer-readable storage device having a computer-readable program stored therein, where the computer-readable program, when executed on a computing device improves the computing device and causes the computing device to receive a lift tab ramp load time profile for a voice coil motor. The computing device also causes the computing device to determine a load torque profile for a lift tab on the ramp based at least on the received ramp load time profile. The computing device also causes the computing device to receive a lift tab ramp unload time profile for the voice coil motor. The computing device also causes the computing device to determine an unload torque profile for the lift tab on the ramp based at least on the received ramp unload time profile. The computing device also causes the computing device to calculate a ramp friction torque component based on the determined load torque profile and unload torque profile.

BRIEF DESCRIPTION OF THE DRAWINGS

FIG. 3 is a ramp load time profile for a lift tab on a ramp, including head velocity and actuator arm motor current versus time, according to various embodiments.

FIG. 4 is a ramp load time profile for the head and motor current versus time graph based on the slider load profile graph of FIG. 3, according to various embodiments FIG. 5 is a ramp load angle profile with head position and actuating motor torque profile with head position graph based on FIG. 4, according to various embodiments FIG. 6 is a ramp unload time profile for a lift tab on a ramp, including head velocity and actuator arm motor current versus time, according to various embodiments.

FIG. 7 is a ramp unload time profile for the head and motor current versus time graph based on the slider unload profile graph of FIG. 6, according to various embodiments FIG. 8 is an ramp unload angle profile with head position and actuating unload motor torque profile with head position graph based on FIG. 7, according to various embodiments

DETAILED DESCRIPTION

The present disclosure relates to improvements to aspects of hard-disk drives, and in particular to slider load/unload technology for use in hard-disk drives. Systems and methods of the present invention permit the ability to perform measurement or assessment in situ (i.e., where various components are in natural/original positions or places during measurement) of a ramp within a hard-disk drive.

Figure 2:
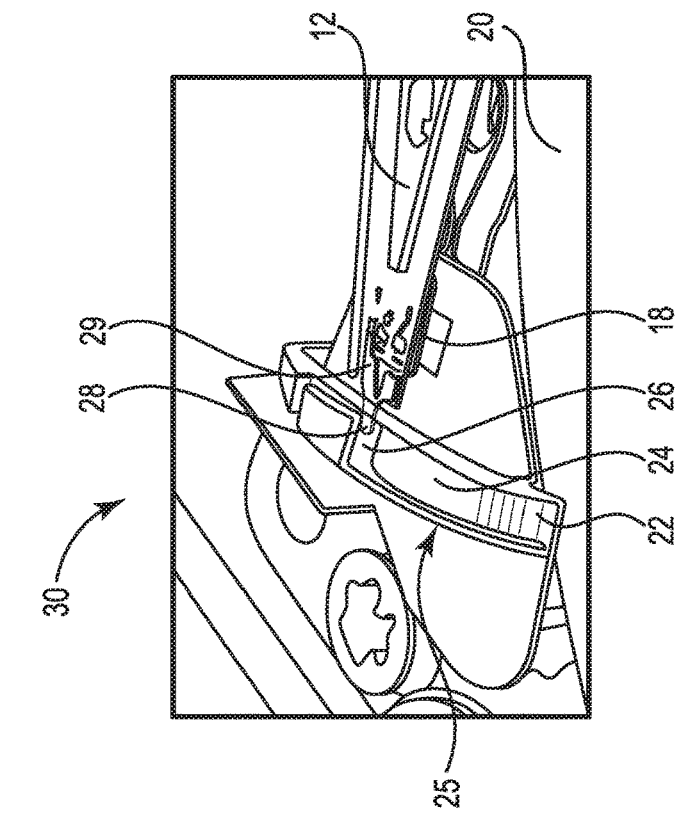
FIG. 2 is a detailed view of a ramp and a lift tab of the slider load/unload components of FIG. 1.
Figure 1:
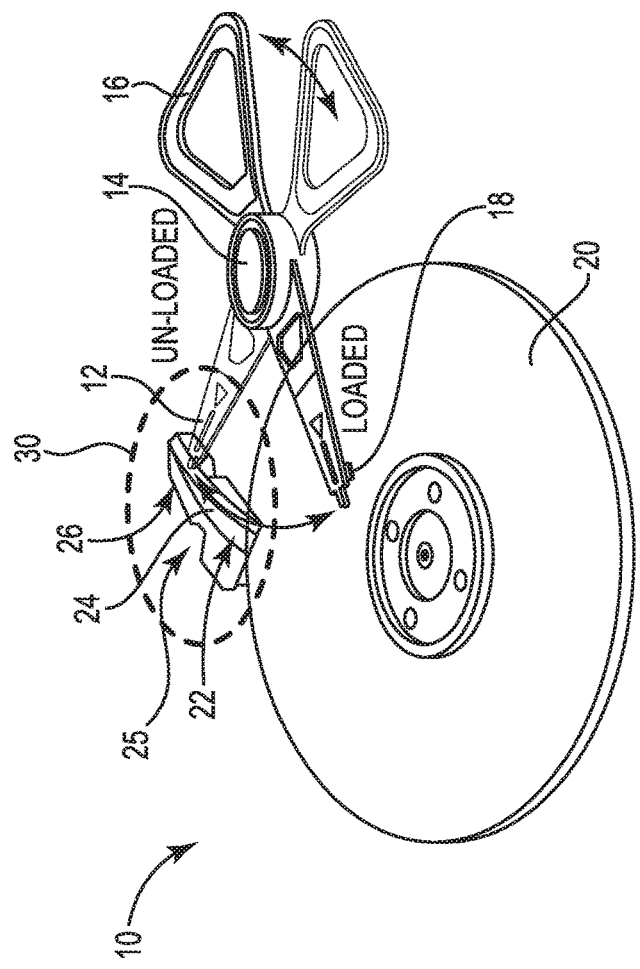
FIG. 1 is a schematic view of hard-disk drive slider load/unload components, according to various embodiments.

With reference now to FIGS. 1 and 2, a hard-disk drive (HDD) storage system 10 is configured to read and write information stored magnetically on concentric circular tracks on one or more memory disks 20, which can be rotatable magnetic recording media. Information or data is stored on the surface of the disks 20 via a transducer or read/write head (not shown) located on an aerodynamic head slider 18. The data is divided or grouped together in tracks. There can be more than one slider 18 and corresponding read/write head, positioned on or near both sides of each disk 20, which can read and write information on the disk(s) 20 when the head(s) are accurately positioned over one of the designated or target tracks on the surface of the disk(s) 20. As a disk 20 spins and when the read/write head and slider 18 is accurately positioned above a target track, the read/write head can store or write data onto a track by writing onto the disk 20 in a particular manner. Similarly, reading data on a disk 20 can be accomplished by positioning the read/write head above a target track and reading the stored material on the disk 20. To write on or read from different tracks, the read/write head and slider 18 is moved radially across the concentric tracks to the target track.

The one or more disks 20 can be spaced apart and rotated about a common spindle, but only one disk 20 is shown for simplicity. Because of the importance of positioning the read/write head and slider 18 substantially parallel to the disk 20 surface, a head gimbal assembly (HGA) 29 (shown best at FIG. 2, some details not shown but understood in the art) is mounted on an actuator arm 12. HGA 29 can includes various flexures (not shown) and/or movable components configured to permit slider 18 movement, including pitching, rolling, etc. As shown, the slider is positioned at the distal end of the actuator arm 12 on the HGA 29, and the read/write head can be positioned at a distal end of the slider 18. The flexure of the HGA 29 allow the read/write head and slider 18 to gimbal for pitch and roll to follow fluctuations in disk 20 surface, but can restrict motion in the radial and circumferential directions of the disk 20. The proximal end of the actuator arm 12 is coupled to a pivot assembly 14 configured to allow for axial, low-friction pivot of the actuator arm 12.

The pivot assembly 14 is in turn connected to a servo and/or motor system. The motor system can include a VCM 16, an angular detection device (not shown), and a current measurement device (not shown). The current measurement device can be configured to measure current used or received at the VCM 16 while in use. The angular detection device can be configured to measure actuator arm 12 angle while in use. The motor system can be operatively and rotatably connected to an actuator assembly, which can include the actuator arm 12 and a flexible or movable head suspension assembly (HSA) (not shown). The motor system can also be operatively and rotatable connected to a lift tab 28. The actuator arm 12 and the HSA can be produced separately and joined together during manufacturing and assembly of the actuator assembly.

The lift tab 28 can be attached at a distal end of actuator arm 12, at a location beyond the position of the slider 18. The lift tab 28 can optionally be located at any suitable location of the actuator arm 12. The lift tab 28 can also be configured to contact and interact with the ramp assembly 25 in a sliding (kinetic friction) or static ("stiction" or static friction) manner during an unloading operation. The lift tab 28 can be operatively coupled to the actuator arm 12. The ramp assembly 25 can be used to slidably interact with the lift tab 28 such that the lift tab 28 is selectively positioned when not in use (i.e. when unloaded). For example, the ramp assembly 25 can include a trough-like unloaded section 26, which can function as a lift tab 28 detent. The unloaded section 26 can work in conjunction with the actuator arm 12, which can have a biased downward force that causes the lift tab 28 to be securely positioned at unloaded section 26 when not in use. The unloaded section 26 of the ramp assembly 25 can be employed when the drive is turned off, not in use, or in a case of an imminent physical impact of the drive, among other times and situations. Further, a controller (see, e.g., 210 of FIG. 11) can be included that is configured to operably detect ramp assembly 25 friction by performing various methods and operations as described herein.

The actuator assembly of the disk drive system 10, including the VCM 16 and the actuator arm 12, can be configured to mount and controllably position the read/write head and slider 18 on a desired portion of the disk 20. As the disk drive system 10 (e.g., a controller thereof) sends control signals to the VCM 16, the VCM 16 rotates, thereby displacing the actuator arm 12 supporting the read/write head and slider 18 across the disk 20 in a radial direction to the target track. The control signals can indicate to the VCM 16 the magnitude (e.g., in terms of current, torque, speed, rotation in degrees, etc.) and direction of the displacement, and vice-versa.

In disk drive system 10, a ramp assembly 25 is utilized to prevent actuator arm 12 and specifically the slider 18 and read/write head transducer it supports from contacting the disk 20 when the slider 18 is positioned at the unloaded, non-operating "park" position referred to as the unloaded section 26. In the unloaded section 26, the actuator arm 12 is moved to the perimeter of the disk 20 where the ramp assembly 25 is located. The ramp assembly 25 can be located adjacent the edge of the disk 20, so that no data storage space on the disk 20 is lost or made unusable. Alternatively, the ramp assembly 25 can be located at the perimeter of the disk 20 over an otherwise un-recordable region of the disk 20. Generally, the read/write head cannot read or write data when the actuator arm 12 is unloaded at 26, on the ramp assembly 25. As the lift tab 28 approaches the unloaded section 26 on the ramp assembly 25 during an unload operation, a sloping load ramp section 22 of the ramp assembly 25 displaces and biases the actuator arm 12 assembly in a vertical direction as the slider 18 approaches the ramp assembly 25 to prevent the slider 18 from touching the disk 20 even in the event of a significant shock. Ramp assembly 25 can include a series of different contoured ramp sections or regions, such as the sloping load ramp section 22, a flat ramp section 24, and the unloaded section 26.

During a loading process (moving the actuator arm 12 into position to have an associated read/write head and slider 18 fly over the disk 20) and an unloading (rotatably moving the actuator arm 12 onto the ramp assembly 25) process, debris can be generated in response to a portion of the actuator arm (e.g., the flexure) sliding or rubbing against a ramp assembly 25 surface. The ramp assembly 25 can be made of plastic, whereas various other components, such as a head gimbal assembly 29, lift tab 28, or flexure, can be made of metal. Metal (e.g., stainless steel) components can scrape away at any surface that it rubs against, including the ramp assembly 25. As a result, ramp assembly 25 friction can vary over the life of the disk drive system 10, causing precise calibrations to repeatedly become mis-calibrated.

As stated in the background, above, present ramp assembly 25 friction testing systems can be destructive in nature to an undue degree. Methods and systems described herein have been devised to test ramp assembly 25 friction as it varies over time, e.g., after repeated and/or extensive use. The present disclosure uses in situ, computerized systems and methods to measure ramp assembly 25 friction without causing additional mechanical wear or destruction of the ramp assembly 25 being measured to an undue degree.

The present disclosure includes methods and systems for controlling ramp load/unload operations within a drive (shown, e.g., at FIGS. 1 and 2, above). As an overview, embodiments include holding constant velocity and/or angular travel distance of a head and recoding corresponding time profiles based on various readings or aspects. The various readings or aspects can include moving velocity/angular travel distance and voice coil motor (VCM) or servo unit current, among others. Time profiles, as used herein, can be charts or datasets that compare the various readings or aspects to time, for example, as a line graph and/or a data-based representation thereof.

With reference now to FIG. 3, a lift tab load time profile 300 includes a ramp load travel velocity profile 310 and a VCM load current profile 312. As shown, ramp load travel velocity profile 310 and a VCM load current profile 312 are plotted with respect to time. In various embodiments, the lift tab load time profile can include ramp load travel velocity profile 310, a VCM load current profile 312, and/or other profiles in terms of various parameters, as appropriate. Velocity profile 310 and current profile 312 can be time profiles, with various aspects plotted with respect to velocity or current, respectively. Other "profiles" as used herein, can be employed in a similar fashion and according to other aspects, and are intended to serve as a profile to highlight a particular aspect with respect to other aspect(s).

As described above, methods and systems used for measuring ramp friction in a disk drive system 10 are disclosed. As shown with respect to FIG. 1, above, the VCM 16 can be used to actuate the actuator arm 12 having a slider 18 and a read/write head positioned thereon and supported thereby. The VCM 16, during drive 10 use and operation, can receive/output various readings and information to be received, analyzed, or otherwise utilized in other processes. The VCM 16 can be an electric motor that can receive feedback in the form of back electromotive force (BEMF). In various embodiments, the larger the velocity/angular velocity of the actuator arm 12, the higher the corresponding and measurable BEMF, which can be measured by a servo controller (not shown). For example, during or after a load operation, the VCM 16 can output an actuator arm 12 load time profile 300. It is noted that load time profile 300 refers to the action of actuator arm 12 loading (or likewise, unloading), and not to the electromotive "load" on the actuator arm 12. The lift tab load time profile 300 can be traced based on the velocity profile 310, and based on known drive aspects. A time profile of actuating torque can be calculated based on the drive's VCM load current profile 312, as described below.

The VCM 16 can also output a lift tab unload time profile 600 during or after an unload operation, as described in more detail with respect to FIG. 6.

Referring still to FIG. 3, and according to various embodiments, a method can include receiving the lift tab ramp load time profile 300 for the VCM 16. The received ramp load time profile 300 can include information with respect to one or more aspects or parameters. For example, the ramp load time profile 300 can include a ramp load travel velocity profile 310 with respect to time, and/or a VCM load current profile 312, also with respect to time. Other profiles, or a single profile of the above can alternatively be included in the ramp load time profile 300, as appropriate. Examples of velocity and current profiles with respect to time are shown at 314 and 316, respectively.

Figure 9:
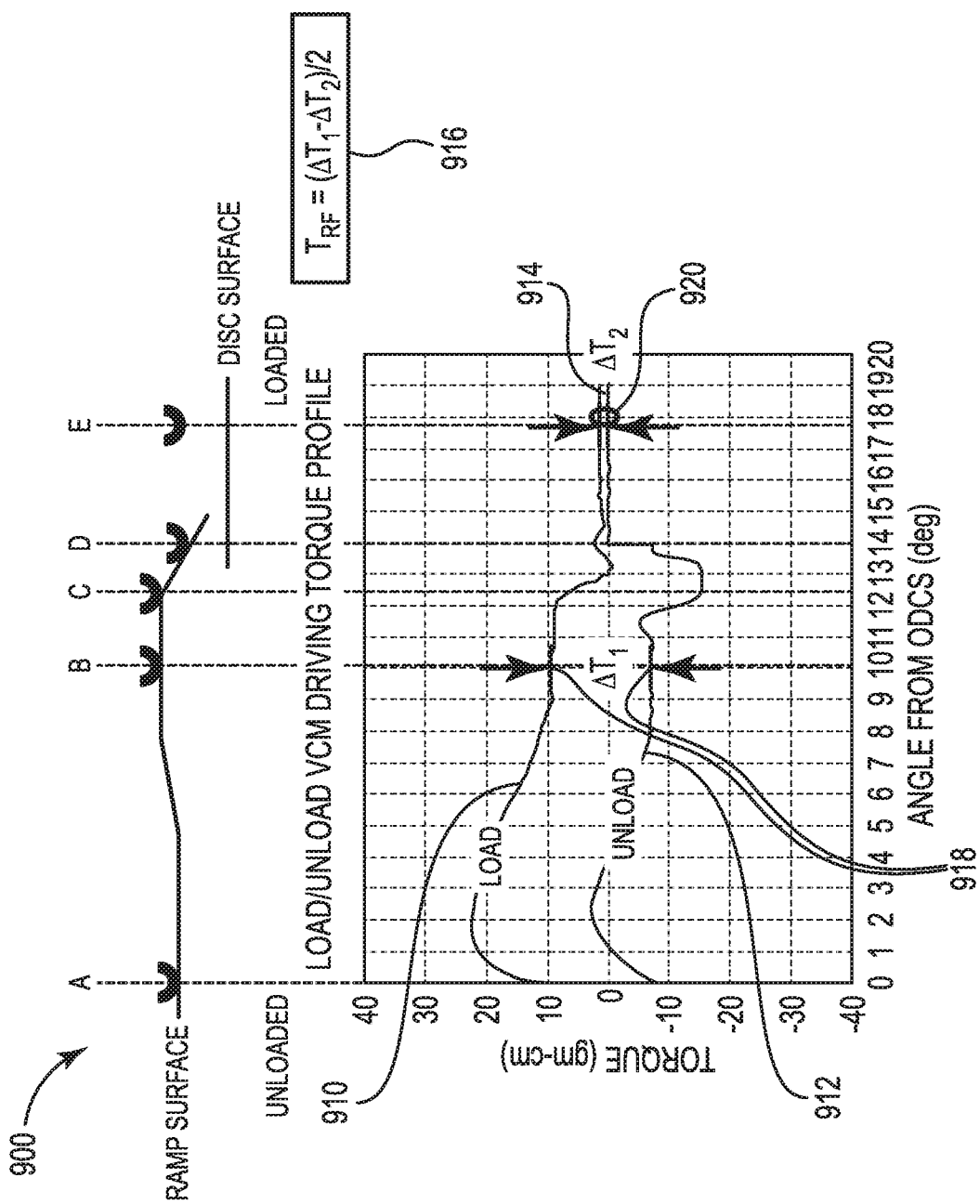
FIG. 9 is a composite ramp angle profile of the load torque profile and the unload torque profile of FIGS. 5 and 8, according to various embodiments.

As the lift tab 28 reaches and is supported at sections of the ramp assembly 25, various load or unload operation times can correspond to various positions of the lift 28 on the ramp assembly 25. As described herein, the ramp assembly 25 includes positions A, B, C, D, and E, as shown with respect to FIG. 9, with each position including an associated time of $t_A$, $t_B$, $t_C$, $t_D$, and $t_E$.

With reference now to FIGS. 3 and 4, a first (load) timeframe is between positions A and C and has corresponding times $t_A$ and $t_C$ that can be identified for the VCM load current profile 312 with respect to time based on the received ramp load travel velocity profile 310. The angular distance between A and C can be a known angular distance. For example, the angular distance between A and C can be pre-determined during a drive's design stage. Therefore, the angular distance can be a design parameter and can be fixed and known for a given model of drive. In embodiments, the first timeframe is defined and bounded by a first start time $t_A$ and a first stop time $t_C$. The first start time $t_A$ can represent when the lift tab 28 is at a resting position on the ramp assembly 25 prior to a load operation and the first stop time $t_C$ can represent when the lift tab 28 begins to descend down the ramp assembly 25 toward a rotatable magnetic storage medium 20 of the hard-disk drive during a load operation. First start time $t_A$ can correspond to location A as used herein, and first stop time $t_C$ can correspond to location C, as used herein. The receiving the ramp load time profile 300 and the ramp unload time profile can be received in situ and nondestructively of the ramp assembly 25, and are received without the use of a mechanical torque tester.

With reference again to FIG. 3, the ramp load time profile 300 can include a first time ($t_B$) corresponding to a flat ramp portion at B (see also FIG. 9) and a second time ($t_E$) corresponding to a slider fly height turnaround portion at loaded position E. In addition, another time $t_D$ and corresponding position D can be representative of the lift tab 28 when positioned (e.g., while loading or unloading) on a sloping load ramp section 22. In addition to times $t_A$ and $t_C$ (and respective positions A and C) with reference to FIGS. 3-5 and times $t_A$ and $t_D$ (and respective positions A and D) with reference to FIGS. 6-8, additional times $t_B$ and $t_E$ and corresponding positions B and E can be representative of the lift tab 28 when positioned (e.g., while loading or unloading) on ramp flat portion 24 and slider fly height turnaround position (on disk 20 surface) E.

With reference to FIG. 4, in some embodiments, another ramp load time profile 400 includes lift tab or read/write head angular travel distance profile 410 and a load current profile 412 with respect to time for a load operation. The ramp load travel velocity profile 310 of FIG. 3 can be integrated to arrive at angular travel distance profile 410 of FIG. 4. Known or received characteristics of the associated drive 10 (such as actuator arm length, etc.) can be used to transform the load velocity profile (linear) to the angular travel distance (rotational).

Load current profile 412 can be selected as a duration of concern or interest excerpted from VCM load current profile 312 of FIG. 3. Angular travel distance profile 410 can include an example angular head travel distance 414 with respect to time, which can be held linearly constant, as shown. Corresponding load current profile 412 with respect to time can be similar to (and can be derived from) VCM load current profile 312, and example current profile 416 between first start time $t_A$ and a first stop time $t_C$ can have a similar shape and profile to example current profile 316 of FIG. 3, being rescaled accordingly to fit load angular travel distance profile 410.

With reference now to FIG. 5, a ramp load angle profile 500 includes a VCM load current profile 510 and torque 512 profiles plotted with respect to actuator arm rotation angle (position) for a load operation as previously outlined with respect to FIG. 4. A method for measuring ramp assembly 25 friction can include determining a load torque profile 512 for a lift tab 28 on the ramp assembly 25 based at least on an aspect of the received ramp load time profile 300. VCM load current profile 510 of FIG. 5 can be transformed to VCM current at load torque profile 512 with a VCM torque constant value.

According to various embodiments, the load torque profile 512 comprises various components. Examples of components of the load torque profile 512 include a ramp friction torque component, a pivot friction torque component, and a bias torque component (a breakdown of the individual components is not shown). In some embodiments the pivot friction torque component is directional and dependent on a moving direction during a respective load or unload operation. According to various embodiments, the actuator arm 12 can be supported by the pivot assembly 14 (e.g., a pivot cartridge). The pivot cartridge can include, e.g., two ball bearings, and pre-load can be applied to the ball bearings. Therefore, a "pivot" friction torque can occur when the actuator arm 12 rotates, and this is referred to as pivot friction torque, herein. A goal of determining the load torque profile 512 is also based on a respective constant lift tab angular travel distance profile 410 and current profile 412 of the VCM 16 with respect to time as measured at the VCM 16 for the lift tab 28 and the ramp assembly 25.

Still with reference to FIG. 5, the determining of the load torque profile 512 can further be based on a load torque reading received at the VCM 16 with respect to an angle of an actuator arm 12 associated with the VCM 16 during a load operation. Determining the load torque profile 512 can include determining a load angular travel distance profile 410, by for example, integrating the ramp load travel velocity profile 310 with respect to time. Angle from OCDS of ramp load angle profile 500 (shown as the x-axis of ramp load angle profile 500 of FIG. 5) can be related to or derived from the load angular travel distance 410 (shown as the y-axis of the load angular travel distance profile 410 of FIG. 4). Load torque at various points of the load torque profile 512 can be calculated from travel and current profiles at 410 and 412 of FIG. 4 and transformed using known formulas and constants to arrive at an example load torque profile 516. An example load current profile 514 can correlate to example 416, but can be plotted from locations A to C in terms of actuator arm 12 angular rotation instead of time.

Turning now to FIGS. 6-8, a lift tab ramp unload time profile 600 for the VCM can be calculated and/or received using a VCM 16 and actuator 12 with a read/write head and slider 18 positioned thereon. In embodiments, the receiving the ramp unload time profile 600 can be similar to the receiving the ramp load time profile 300 as described with respect to FIGS. 3-5, above. However, for the determining or receiving the ramp unload time profile 600, instead of moving from an unloaded lift tab 28 position on 25 to a loaded position on the disk 20, the ramp unload operations can be performed in reverse and from varied locations and directions along a load-unload head lift tab-ramp and disk surface path (A-E). As shown in FIGS. 6-8, a measurement can include a timeframe and path between positions D and A with corresponding times $t_D$ and $t_A$.

With reference to FIG. 6, a ramp unload time profile 600 for the VCM 16 can be received or otherwise determined. The ramp unload time profile 600 can include an unload velocity profile 610 with respect to time, and an unload current profile 612 with respect to time. The unload velocity profile 610 with respect to time can include an example velocity profile 614 with respect to time between $t_D$ and $t_A$. Likewise, the unload current profile 612 can include an example current profile 616 between identified times $t_D$ and $t_A$ correspond to lift tab positions D and A, respectively. The angular distance between A and D can be known. According to various embodiments, a second timeframe between $t_D$ and $t_A$ can be identified for the unload current profile 612 with respect to time based on the received unload velocity profile 610. The second timeframe includes a second start time $t_D$ and a second stop time $t_A$. The second start time ($t_D$) can be when the lift tab begins to ascend up the ramp assembly 25 away from a rotatable magnetic storage medium 20 of the drive 10 during an unload operation, and the second stop time ($t_A$) can be when the lift tab 28 is at a resting position on the ramp assembly 25 after the unload operation is completed. According to various embodiments, the receiving the ramp load time profile 300 and the ramp unload time profile 600 are received in situ and nondestructively of the ramp assembly 25.

With reference again to FIG. 6, the unload time profile 610 can include a first time ($t_D$) corresponding to a sloping ramp section 22 at D (see also FIG. 9) and a second time ($t_A$) corresponding to a ramp unloaded position at A. In addition to times $t_A$ and $t_C$ (and respective positions A and C) with reference to FIGS. 3-5 and times $t_A$ and $t_D$ (and respective positions A and D) with reference to FIGS. 6-8, additional times $t_B$ and $t_E$ and corresponding positions B and E can be representative of the lift tab 28 when positioned (e.g., while loading or unloading) on ramp flat portion 24 and slider fly height turnaround position (on disk 20 surface) E.

With reference now to FIG. 7, another ramp unload time profile 700 shows a head unload angular travel distance profile 710 and a VCM 16 unload current profile 712 with respect to time, times $t_A$ and $t_D$ can be reversed (mirrored) on the x-axis, giving a graphical form and appearance somewhat similar to that of FIG. 4. Unload current profile 712 can be a duration of concern or interest excerpted from unload current profile 612. The unload angular travel distance profile 710 can be derived from the unload velocity profile 610 of FIG. 6, e.g., through integration, and can be plotted linearly, such as example head travel distance profile 714. The unload current profile 712 can also include an example current profile 716 between $t_A$ and $t_D$, as shown.

According to a ramp unload angle profile 800 of FIG. 8, an unload torque current profile 812 for the lift tab on the ramp can be determined based at least on the received ramp unload time profile 600. In order to arrive at the unload torque profile 812 and corresponding unload current profile 810, both with respect to angular position, the unload current profile 712 can be processed based on known constants and machine aspects to arrive at torque profile example 816 of torque profile 812 (with respect to angle). Unload angular travel distance profile 710 can be transformed with the unload current profile 712 to output unload current profile 810. Angle from OCDS of ramp unload angle profile 800 (shown as the x-axis of ramp unload angle profile 800 of FIG. 8) can be related to or derived from the unload angular travel distance 710 (shown as the y-axis of the unload angular travel distance profile 710 of FIG. 7). An example unload current profile (with respect to angle) 814 is shown, and may be similar in shape to example 716 of FIG. 7, but rescaled and/or adjusted to different units. Torque profile example 816, as shown, can have a similar shape to the example current profile of 716.

An unload torque profile 812 can be determined for the lift tab 28 on the ramp assembly 25 based at least on the received ramp unload time profile 600. Unload current profile 810 can be transformed to unload torque profile 812 with a VCM 16 torque constant value. Described methods and systems can be used during various drive development stages, and also can be used in the field, e.g., commercial or other real time use. Drive parameters can be stored after measurement the drive is in use. In some embodiments, the drive parameters can be read and referenced, which have been measured and are stored. Alternatively, it can be determined what kind of load/unload data are recorded and used during a load/unload process. The unload torque profile 812 can include a first time B corresponding to a flat ramp portion and a second time corresponding to a slider fly height turnaround portion E.

In some embodiments, the unload torque profile 812 comprises an unload ramp friction torque component, a pivot friction torque component, and a bias torque component (not shown). The pivot friction torque component can be directional and dependent on a moving direction during a respective load or unload operation.

The determining the unload torque profile 812 can also be based on a respective constant unload lift tab angular travel distance profile 710 of the VCM 16 with respect to the lift tab 28 and the ramp assembly 25. The determining the unload torque profile 812 can further be based on an unload torque received at the VCM 16 with respect to an angle of the actuator arm 12 associated with the VCM 16 during an unload operation. The determining the unload torque profile 812 can also include determining an unload angular travel distance profile 710 by integrating the unload velocity profile 610 with respect to time.

With reference again to FIG. 9, load/unload actuating torque with angular position can be obtained. Ramp friction can be determined based on resisting torque that is set to be equal to actuating torque on a ramp flat portion (e.g., flat ramp portion 24 of FIGS. 1 and 2 corresponding to position B, shown in FIG. 9).

In more detail, the calculation of a ramp assembly's 25 friction torque component can be based on the determined load torque profile 512 and unload torque profile 812. As shown, composite ramp angle profile 900 includes a measurement of ramp VCM torque (from which friction can be derived) with VCM load/unload operations. Based on the ramp friction torque component at various times, the ramp assembly's 25 friction can be determined non-destructively and in situ. Stated differently, the load torque profile 512 and the unload torque profile 812, derived as shown and described with respect to FIGS. 3-5, and 6-8, respectively, can be superposed on a single head angular rotation scale at composite ramp angle profile 900 to make certain conclusions about the friction of the ramp assembly 25. Optionally, any visually-depicted analysis herein can be conducted by a computer system without a display.

In some embodiments, the calculating the ramp friction torque component includes subtracting measurements at various times/locations of the unload torque profile 812 from the corresponding times/locations of the load torque profile 512. As shown, a load actuator arm torque profile with respect to angular distance is shown at 910, corresponding to load torque profile 512. Also shown is an unload actuator arm torque profile also with respect to angular distance at unload torque profile 912.

Calculating the ramp friction torque component can include subtracting the unload torque profile 912 from the load torque profile 910 (vertical distance 920, representing a difference in measured unload/load torque at this position) at a second time (e.g., $t_E$ corresponding to position E) near slider fly height turnout portion 914, from the load torque profile at a first time (e.g., $t_B$ corresponding to position B) (vertical distance 918, representing a difference in measured unload/load torque at this position) and dividing the result by two. The result of the above can be divided by two to take the average friction of the lift tab 28 on the ramp assembly 25 while the lift tab 28 travels in the load or unload direction, which can be equal and irrespective of direction.

This calculation of ramp assembly 25 friction can be represented by the formula 916, which more precisely uses the difference in the load torque profile 910 and unload torque profile 912 at points B and E (and the corresponding times $t_B$ and $t_E$), and divides the difference measured at this two points in order to output a measured ramp assembly 25 friction. The calculating the ramp friction torque can also be based on the pivot friction torque component according to various embodiments. The total resisting torque can be a combination or summation of ramp friction torque, pivot friction torque, and bias torque. The friction torque is directional and dependent of moving directions with load/unload. The bias torque is unidirectional and independent of moving directions with load/unload. Ramp friction torque can be obtained from the difference between the load/unload torques using the formula 916. The pivot friction torque and corresponding force is generally in a direction in reverse to a direction of pivot motion. In the embodiments described, a pivot friction torque value is generally similar for most angles and locations since it induced by ball bearings.

The resisting torque is equal to actuating torque at flat portion B and on disk surface E. The resisting torque can be expressed as: $T_{L/UL}=T_{RF}+T_{PF}+T_{MB}+T_{PB}$. $T_{L/UL}$ is load/unload resisting torque, $T_{RF}$ is ramp friction torque, $T_{PF}$ is pivot friction torque, $T_{MB}$ is bias torque by latch force, and $T_{PB}$ is bias torque by PCC force. $T_{MB}$ and $T_{PB}$ are unidirectional and independent of moving directions with load/unload. The difference ($\Delta$) between load and unload at position B and E are: $\Delta T_1=(T_{RF}+T_{PF})*2$, $\Delta T_2=T_{PF}*2$. Hence, the ramp friction torque is $T_{RF}=(\Delta T_1-\Delta T_2)/2$ (formula 916).

Benefits of the present disclosure can include adaptive control within a drive during operation. For example, a drive can benefit from adaptive control because a drive is subject to various changes and factors over time. A drive can perform adjustments to various control factors and coefficients in response to changes in environmental factors, wear of parts, other movements, or various other conditions. Yet other benefits can include process control built-in self-testing, where a drive can perform diagnostics, scans, tests, and various other assessment procedures, whether or not related to adaptive control, outlined, above. These and other benefits are described in greater detail with respect to the description, herein.

Figure 10:
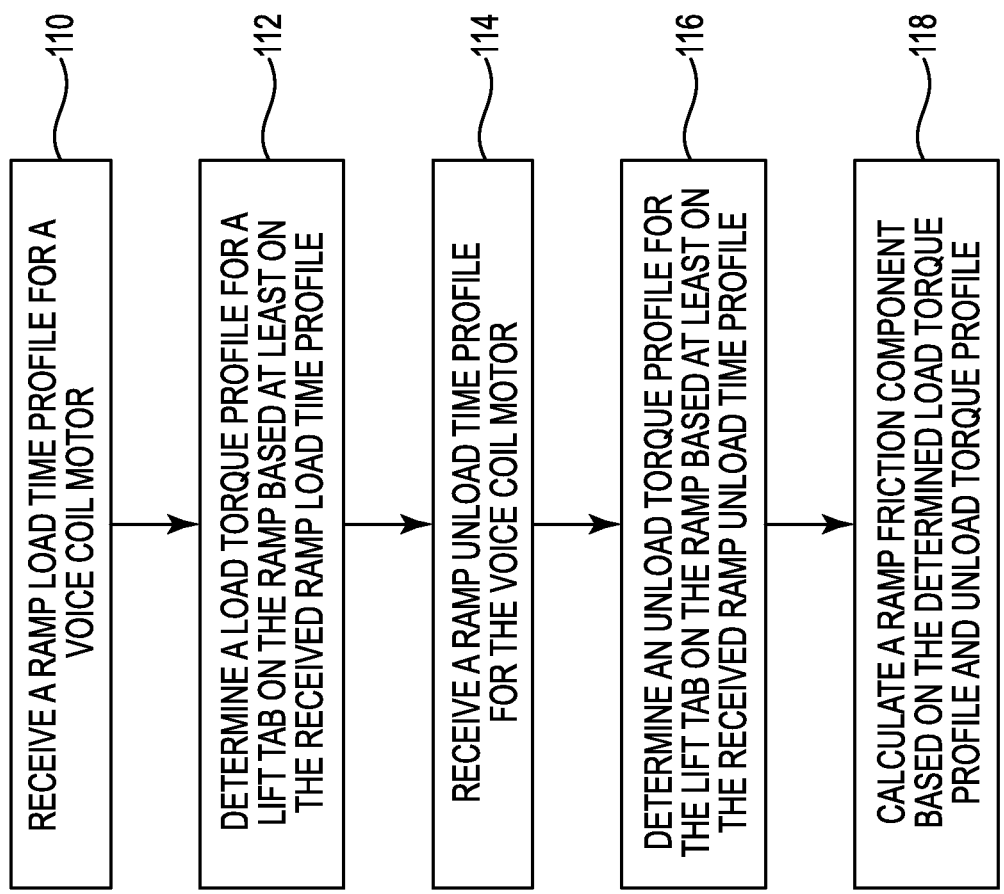
FIG. 10 is a flowchart for a method of determining ramp friction, according to various embodiments.

FIG. 10 is a flowchart 100 for a method of determining ramp friction, according to various embodiments.

As operation 110, a method of determining ramp friction can include receiving a ramp load time profile for a VCM, e.g., VCM 16. At operation 112, the method can also include determining a load torque profile for a lift tab on the ramp based at least on the received ramp load time profile. At operation 114, a method can include receiving a ramp unload time profile for the VCM. At operation 116, the method can include determining an unload torque profile for the lift tab on the ramp based at least on the receiving ramp unload time profile. At operation 118, the method can also include calculating a ramp friction component based on the determined load torque profile and the unload torque profile, as described herein.

Figure 11:
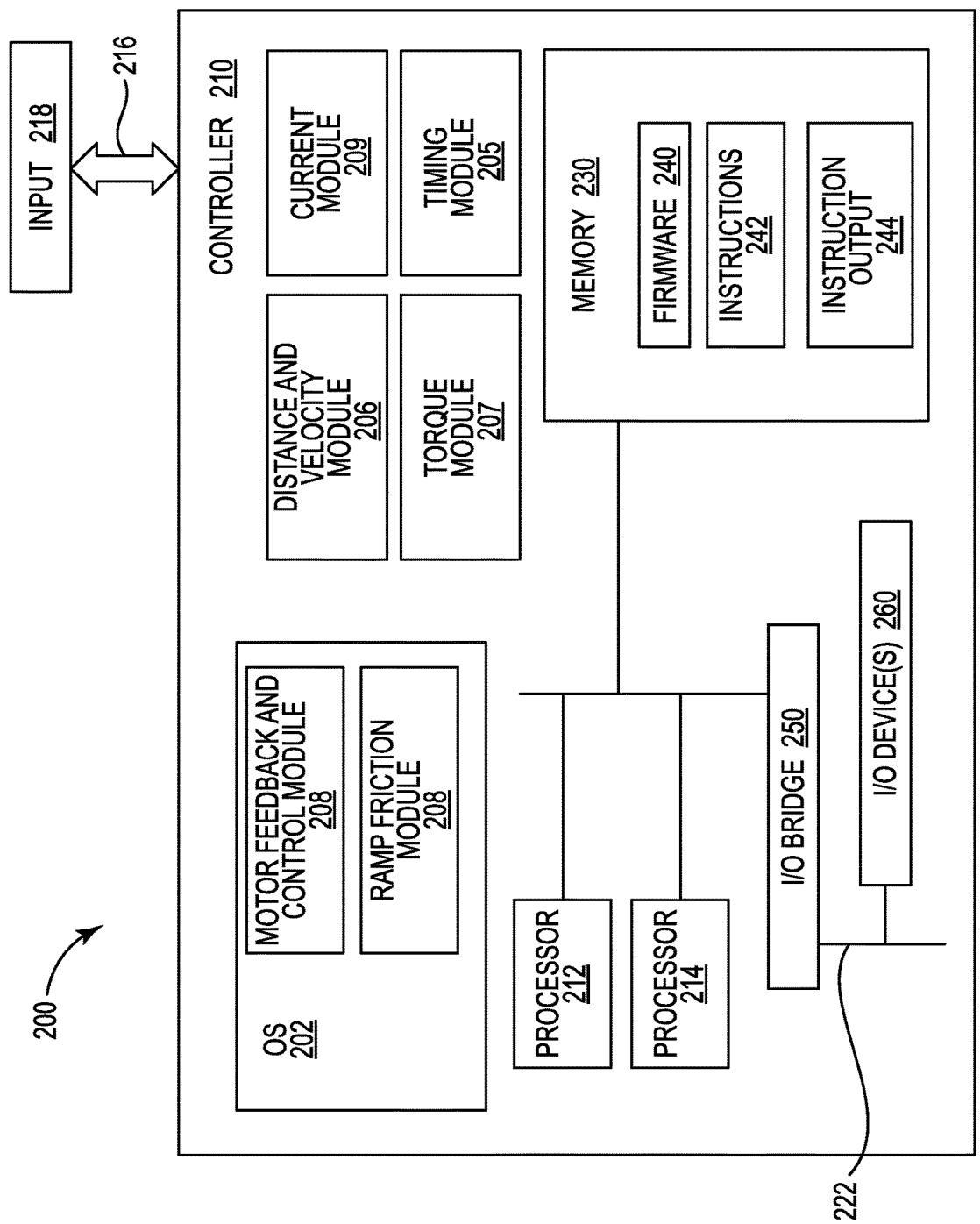
FIG. 11 is a block schematic diagram of a computer system according to embodiments of the present disclosure.

FIG. 11 is a block schematic diagram of a computer system 200 according to embodiments of the present disclosure.

Computer system 200, as shown, is configured with an interface 216 to enable controller 210 to receive a request to nondestructively measure ramp friction in a hard-disk drive load/unload feature, as described in particular with regard to FIGS. 3-9. A computer program product can be provided for measuring ramp friction in a disk drive system, comprising: a computer-readable storage device having a computer-readable program stored therein, where the computer-readable program, when executed on a computing device improves the computing device and causes the computing device to perform various methods described herein. An input 218 may be received at interface 216. In embodiments, the interface 216 can enable controller 210 to receive, or otherwise access, the input 218 via, for example, a network (e.g., an intranet, or a public network such as the Internet), or a storage medium, such as a disk drive internal or connected to controller 210. The interface can be configured for human input or other input devices, such as described later in regard to components of controller 210. It would be apparent to one of skill in the art that the interface can be any of a variety of interface types or mechanisms suitable for a computer, or a program operating in a computer, to receive or otherwise access or receive a source input or file.

Processors 212, 214 included in controller 210 are connected by a memory interface 220 to memory device or module 230. In embodiments, the memory 230 can be a cache memory, a main memory, a flash memory, or a combination of these or other varieties of electronic devices capable of storing information and, optionally, making the information, or locations storing the information within the memory 230, accessible to a processor. Memory 230 can be formed of a single electronic (or, in some embodiments, other technologies such as optical) module or can be formed of a plurality of memory devices. Memory 230, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 200 can include a plurality of memory devices. A memory interface, such as 220, between a one or more processors and one or more memory devices can be, for example, a memory bus common to one or more processors and one or more memory devices. In some embodiments, a memory interface, such as 220, between a processor (e.g., 212, 214) and a memory 230 can be point to point connection between the processor and the memory, and each processor in the computer 200 can have a point-to-point connection to each of one or more of the memory devices. In other embodiments, a processor (for example, 212) can be connected to a memory (e.g., memory 230) by means of a connection (not shown) to another processor (e.g., 214) connected to the memory (e.g., 220 from processor 214 to memory 230).

Computer 200 can include an input/output (I/O) bridge 250, which can be connected to a memory interface 220, or to processors 212, 214. An I/O bridge 250 can interface the processors 212, 214 and/or memory devices 230 of the computer 200 (or, other I/O devices) to I/O devices 260 connected to the bridge 220. For example, controller 210 includes I/O bridge 250 interfacing memory interface 220 to I/O devices, such as I/O device 260. In some embodiments, an I/O bridge can connect directly to a processor or a memory, or can be a component included in a processor or a memory. An I/O bridge 250 can be, for example, a peripheral component interconnect express (PCI-Express) or other I/O bus bridge, or can be an I/O adapter.

An I/O bridge 250 can connect to I/O devices 260 through an I/O interface, or I/O bus, such as I/O bus 222 of controller 210. For example, I/O bus 222 can be a PCI-Express or other I/O bus. I/O devices 260 can be any of a variety of peripheral I/O devices or I/O adapters connecting to peripheral I/O devices. For example, I/O device 260 can be a graphics card, keyboard or other input device, a hard disk drive (HDD), solid-state drive (SSD) or other storage device, a network interface card (NIC), etc. I/O devices 260 can include an I/O adapter, such as a PCI-Express adapter, that connects components (e.g., processors or memory devices) of the computer 200 to various I/O devices 260 (e.g., disk drives, Ethernet networks, video displays, keyboards, mice, styli, touchscreens, etc.).

Computer 200 can include instructions 242 executable by one or more of the processors 212, 214 (or, processing elements, such as threads of a processor). The instructions 242 can be a component of one or more programs. The programs, or the instructions 230, can be stored in, and/or utilize, one or more memory devices of computer 200. Memory 230 can also store one or more instruction output 244. As illustrated in the example of FIG. 11, controller 210 includes a plurality of programs or modules, such as current module 209, head angular distance and velocity module 206, torque module 207, and timing module 205. A program can be, for example, an application program, an operating system (OS) or a function of an OS, or a utility or built-in function of the computer 200. A program can be a hypervisor, and the hypervisor can, for example, manage sharing resources of the computer 200 (e.g., a processor or regions of a memory, or access to an I/O device) among a plurality of programs or OSes.

Programs can be "stand-alone" programs that execute on processors and use memory within the computer 200 directly, without requiring another program to control their execution or their use of resources of the computer 200. For example, controller 210 includes (optionally) stand-alone programs in current module 209, head angular distance and velocity module 206, torque module 207, and timing module 205. A stand-alone program can perform particular functions within the computer 200, such as controlling, or interfacing (e.g., access by other programs) an I/O interface or I/O device. A stand-alone program can, for example, manage the operation, or access to, a memory (e.g., memory 230). A basic I/O subsystem (BIOS), or a computer boot program (e.g., a program that can load and initiate execution of other programs) can be a standalone program.

According to some embodiments, a ramp friction module 204 and a motor (VCM) feedback module 208 may include various scripts that may represent programs or other functions. According the various embodiment, the motor feedback module can be or can include a servo controller, as used and described herein. An example script may be a (e.g., stand-alone) program that can be run once per time image or one time per viewing area of an image.

Controller 210 within computer 200 can include one or more OS 202, and an OS 202 can control the execution of other programs such as, for example, to start or stop a program, or to manage resources of the computer 200 used by a program. For example, controller 210 includes OS 202, which can include, or manage execution of, one or more programs, such as OS 202 including (or, managing) motor feedback and control module 208 and ramp friction module 204. In some embodiments, an OS 202 can function as a hypervisor.

A program can be embodied as firmware (e.g., BIOS in a desktop computer, or a hypervisor) and the firmware can execute on one or more processors and, optionally, can use memory, included in the computer 200. Firmware can be stored in a memory (e.g., a flash memory) of the computer 200. For example, controller 210 includes firmware 240 stored in memory 230. In other embodiments, firmware can be embodied as instructions (e.g., comprising a computer program product) on a storage medium (e.g., a CD-ROM, DVD-ROM, flash memory, or disk drive), and the computer 200 can access the instructions from the storage medium.

In embodiments of the present disclosure, computer 200 can include instructions for nondestructive ramp friction determination. Controller 210 includes, for example, distance and velocity module 206, torque module 207, current module 209, and timing module 205, which can operate, in conjunction with motor feedback and control module 208 and ramp friction module 204 to determine ramp friction. The computer 200 can utilize distance and velocity module 206, torque module 207, current module 209, and timing module 205, which can operate, in conjunction with motor feedback and control module 208 and ramp friction module 204 in a memory 230 of the computer 200, such as controller 210 storing the various current, torque, velocity, distance, and friction measurements and data in memory 230.

The example computer system 200 and controller 210 are not intended to limiting to embodiments. In embodiments, computer system 200 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, controller 210 can be, for example, a computing device having a processor (e.g., 212) capable of executing computing instructions and, optionally, a memory 230 in communication with the processor. For example, controller 210 can be a desktop or laptop computer; a tablet computer, mobile computing device, personal digital assistant (PDA), or cellular phone; or, a server computer, a high-performance computer (HPC), or a super computer. Controller 210 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs. Controller 210 and/or the control module 208 can be operatively connected to the motor system described with respect to FIGS. 1 and 2, above. The controller 210 and/or the control module 208 can also be operably connected to read or control the motor feedback and among other feedback, as appropriate.

It is understood that numerous variations of non-destructive ramp friction measurement could be made while maintaining the overall inventive design of various components thereof and remaining within the scope of the disclosure. Numerous alternate design or element features have been mentioned above.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the invention, it is understood that the features are interchangeable between embodiments to arrive at methods of nondestructively and seamlessly determining ramp friction in a hard-disk drive.

Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the invention will be gained through a discussion of the examples provided.

What is claimed is:

1. A method of analyzing ramp friction in a disk drive using a controller to execute the following steps:
   calculating a ramp load time profile for a voice coil motor of the disk drive;
   determining a load torque profile for a lift tab on the ramp based at least on the ramp load time profile;
   calculating a ramp unload time profile for the voice coil motor;
   determining an unload torque profile for the lift tab on the ramp based at least on the ramp unload time profile;
   calculating a ramp friction torque based on the determined load torque profile and unload torque profile; and
   performing a ramp load or unload operation using the voice coil motor based on the calculated ramp friction torque.

2. The method of claim 1, wherein the ramp load time profile and the ramp unload time profile are calculated in situ and nondestructively of the ramp.

3. The method of claim 1, wherein each of the load and unload torque profiles includes a first time corresponding to a flat ramp portion and a second time corresponding to a slider fly height turnaround portion.

4. The method of claim 3, wherein the calculating the ramp friction torque includes subtracting the unload torque profile from the load torque profile at the second time from the load torque profile at the first time and dividing the result by two.

5. The method of claim 1, wherein each of the load and unload torque profiles comprises:
a ramp load/unload friction torque component,
a pivot friction torque component, and
a bias torque component,
wherein the pivot friction torque component is directional and dependent on a moving direction during a respective load or unload operation.

6. The method of claim 5, wherein the calculating the ramp friction torque is based on the pivot friction torque component of each of the load and unload torque profiles.

7. The method of claim 1, wherein the ramp load time profile further comprises a load angular travel distance aspect with respect to time, and a load current aspect with respect to time, and wherein the ramp unload time profile further comprises an unload angular travel distance profile with respect to time, and an unload current profile with respect to time.

8. The method of claim 7, wherein the determining the load and unload torque profiles are each also based on a respective load or unload current profile of the voice coil motor with respect to a corresponding constant load or unload angular travel distance profile.

9. The method of claim 1, wherein the ramp load or unload operation is performed within the disk drive during operation.

10. The method of claim 9, wherein the performing the ramp load or unload operation is adaptive as the disk drive is subject to various changes and factors over time.

11. The method of claim 1, wherein the determining the load torque profile is further based on a load torque received at the voice coil motor with respect to an angle of an actuator arm associated with the voice coil motor during a load operation; and wherein the determining the unload torque profile is further based on an unload torque received at the voice coil motor with respect to an angle of the actuator arm associated with the voice coil motor during an unload operation.

12. The method of claim 11, wherein the determining the load torque profile further comprises determining a load angular travel distance profile by integrating a load velocity profile with respect to time; and wherein the determining the unload torque profile further comprises determining an unload angular travel distance profile by integrating an unload velocity profile with respect to time.

13. The method of claim 12, wherein a first timeframe is identified for the load current profile with respect to time based on the received load velocity profile; and wherein a second timeframe is identified for the unload current profile with respect to time based on the received unload velocity profile.

14. The method of claim 13, wherein the first timeframe includes a first start time and a first stop time, and wherein the first start time is when the lift tab is at a resting position on the ramp prior to the load operation and the first stop time is when the lift tab begins to descend down the ramp toward a rotatable magnetic storage medium of the disk drive during the load operation.

15. The method of claim 13, wherein the second timeframe includes a second start time and a second stop time, and wherein the second start time is when the lift tab begins to ascend up the ramp away from a rotatable magnetic storage medium of the disk drive during an unload operation, and the second stop time when the lift tab is at a resting position on the ramp after the unload operation is completed.

16. A computer program product for analyzing ramp friction in a disk drive system, comprising: a computer-readable storage device having a computer-readable program stored therein, wherein the computer-readable program, when executed on a computing device improves the computing device and causes the computing device to:
calculate a ramp load time profile for a voice coil motor;
determine a load torque profile for a lift tab on the ramp based at least on the ramp load time profile;
calculate a ramp unload time profile for the voice coil motor;
determine an unload torque profile for the lift tab on the ramp based at least on the ramp unload time profile;
calculate a ramp friction torque based on the determined load torque profile and unload torque profile; and
perform a ramp load or unload operation using the voice coil motor based on the calculated ramp friction torque.

17. The computer program product of claim 16, wherein each of the load and unload torque profiles include a first time corresponding to a flat ramp portion and a second time corresponding to a fly height turnaround portion.

18. The computer program product of claim 16, wherein the calculating the ramp friction torque includes subtracting the unload torque profile from the load torque profile at the second time from the load torque profile at the first time and dividing the result by two.

19. The computer program product of claim 16, wherein the ramp load or unload operation is performed within the disk drive during operation.

20. The computer program product of claim 19, wherein the computer-readable program, when executed on the computing device improves the computing device and further causes the computing device to adaptively perform the ramp load or unload operation as the disk drive is subject to various changes and factors over time.

21. A disk drive system, comprising:
a read/write head for reading and writing data on a rotatable magnetic recording medium;
an actuator assembly configured to mount and controllably position the read/write head on a desired portion of the magnetic recording medium, wherein the actuator assembly includes: an actuator arm, a voice coil motor, an angular movement detection device, and a current measurement device configured to measure current used or received at the voice coil motor while in use;
a lift tab operatively coupled to the actuator arm;
a ramp for selectively positioning the lift tab when not in use; and
a controller configured to determine ramp friction, wherein the controller is configured to execute the following steps:
calculating a ramp load time profile for the voice coil motor;
determining a load torque profile for the lift tab on the ramp based at least on the ramp load time profile;
calculating a ramp unload time profile for the voice coil motor;
determining an unload torque profile for the lift tab on the ramp based at least on the ramp unload time profile;
calculating a ramp friction torque based on the determined load torque profile and unload torque profile; and
performing a ramp load or unload operation using the voice coil motor based on the calculated ramp friction torque.

22. The disk drive system of claim 21, herein each of the load and unload torque profiles comprises:
a ramp load/unload friction torque component, a pivot friction torque component, and
a bias torque component,
wherein the pivot friction torque component is directional and dependent on a moving direction during a respective load or unload operation, and wherein the calculating the ramp friction torque is based on the pivot friction torque component of each of the load and unload torque profiles.

23. The disk drive system of claim 21, wherein each of the load and unload torque profiles includes a first time corresponding to a flat ramp portion and a second time corresponding to a slider fly height turnaround portion.

24. The disk drive system of claim 23, wherein the calculating the ramp friction torque includes subtracting the unload torque profile from the load torque profile at the second time from the load torque profile at the first time and dividing the result by two.

* * * * *